Figure 1:
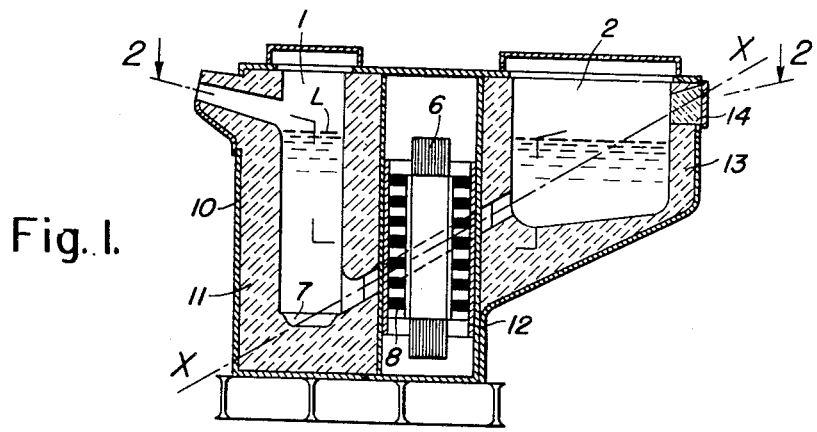

March 7, 1950          M. TAMA          2,499,540

METHOD OF TREATING METALS IN INDUCTION FURNACES

Original Filed May 24, 1945

INVENTOR.
Manuel Tama
BY
Attorney.

Patented Mar. 7, 1950

2,499,540

UNITED STATES PATENT OFFICE 2,499,540

METHOD OF TREATING METALS IN INDUCTION FURNACES

Manuel Tama, Morrisville, Pa., assignor to Ajax Engineering Corporation, Trenton, N. J.

Original application May 24, 1945, Serial No. 595,597. Divided and this application August 21, 1947, Serial No. 769,939

5 Claims. (Cl. 13—29)

The invention which is based on subject matter divided from U. S. Patent No. 2,427,817 relates to induction furnaces of the submerged resistor type, and more particularly to furnaces of this type for melting light metals and alloys.

A difficult problem in the operation of this type induction furnaces resides therein that the impurities and the slags resulting from the melting procedure form deposits in the melting channels, which deposits gradually reduce the working area of the channels and eventually clog them up entirely.

Furthermore, the slags attack and gradually destroy the walls of the melting channels.

In consequence thereof frequent interruptions and shut-downs of the furnace operation result.

It is an object of the invention to provide a submerged resistor type induction furnace which will allow the removal of the slag and other impurities while maintaining the same filled and insofar without interrupting its operation.

A further object of the invention is the provision of melting channels in a furnace of the aforesaid type which may be thoroughly and easily cleaned while the furnace is working and contains its full charge of molten metal.

Another purpose is to provide a furnace of the type described in which the impurities can collect at a spot provided for them free from the path of the normal metal flow and from which they can be removed while the furnace is filled with the charge.

A further purpose is to provide a furnace of the type described in which the metal, as it is poured, has a scouring action on the walls of the melting channels.

The construction and operation of the furnace according to the present invention will best be understood by referring to the drawings wherein two modifications of the furnace have been shown by way of example, this being deemed sufficient for disclosure of the invention as claimed.

Figure 2:
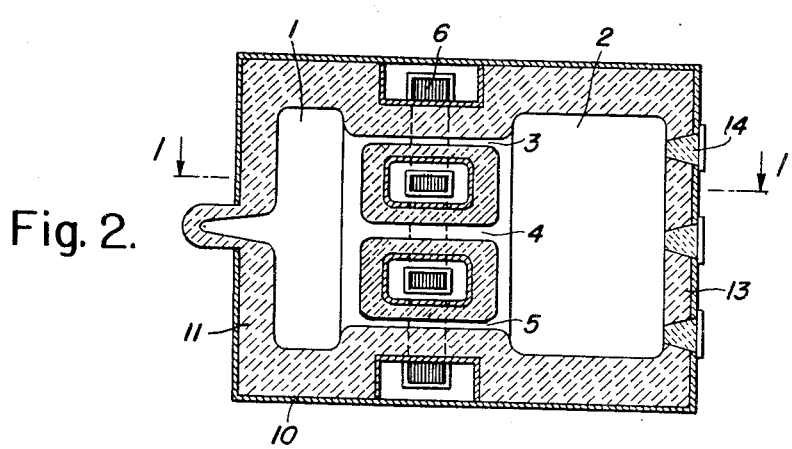
Figure 3:
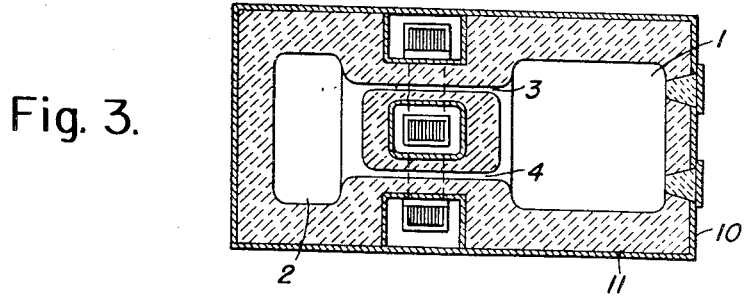

In the drawings,

Fig. 1 is a vertical sectional elevation of a furnace embodying the principal features of my invention taken on line 1—1 of Fig. 2, Fig. 2 is a sectional horizontal elevation of the furnace taken on line 2—2 of Fig. 1, and Fig. 3 is a sectional horizontal elevation similar to that of Fig. 2 showing a furnace which is provided with two melting ducts.

The furnace is provided with two hearths or chambers 1 and 2 which are connected by three melting channels 3, 4, 5. The furnace and its parts are encased in a housing 10 which is lined with a refractory 11.

Transformer assemblies comprising iron cores 6 and primary coils 8 are threaded through secondary loops formed by the melting channels and the bottom sections of the two hearths and are designed to induce current into the molten metal which is filled into the hearths up to level L. The transformer assemblies are insulated from the refractory lining 11 by asbestos cement sleeves 12.

The two primary coils may be connected by a Scott transformer, which consists of two identical balanced transformers interconnecting between three phase and two phase systems, as described on page 2015 of the "Mechanical Engineering Handbook," 1941 and on pages 219 to 222 of "Transformer Engineering" by L. F. Blume, 1938. For a single phase design only one transformer assembly and two connecting ducts 4 will be required, as shown in Fig. 3.

The bottom of the higher chamber 2 is located well above the bottom of the lower chamber or hearth 1 and the melting channels 3, 4, 5 into which the heating current is induced are located in such a manner that any impurities which fall to the bottom of chamber 2 are conducted into the channels 3, 4, 5 and from these channels into the bottom section of hearth 1. For this purpose the bottom of chamber 2 is slanting in a direction towards chamber 1. A recess 7 is provided in the bottom section of chamber 1 and below the entry of the melting channels in which impurities and slags may be allowed to collect. Cleaning openings 14 are provided in the outside wall 13 of hearth 2 on the side opposite to the entering points of the melting channels.

The strongly inclined position of the melting channels forms an important feature in the construction of induction furnaces of the submerged resistor type and signifies the great progress created by this invention. This construction is a perfect safeguard against contamination of the melting channels and of the molten charge. It actually and efficiently solves the difficult problem of slag removal while the furnace remains filled with the charge. The cleaning of the furnace during operation is further improved by the arrangement of recess 7 at the bottom of hearth 1, as explained in a later part of this specification.

As apparent from the drawings, the melting channels are inclined under such an angle, that the extension of an axis $x$ extending parallel to the direction of the inclination strikes the outside wall 13 of hearth 2 at a point which is located adjacent to its upper edge and at least above its middle height.

Therefore, preferably straight cleaning tools can be easily inserted through openings 14 into the metal melting channels and the slag removed therefrom without necessitating an interruption of the furnace operation or an emptying out of the same; also recess 7 may be easily reached by the cleaning tools through openings 14 and impurities accumulated in these recesses may be cleaned out during the working of the furnace. Therefore, the arrangement of the inclined melting channels allows a continuous cleaning of the furnace and prevents the deposition of slags along the channel walls.

On starting the furnace, the melting channels and the surrounding portions of the hearths are preheated and molten metal is poured into hearth 2 to a level slightly above the entering part of the melting channels in that chamber. The metal flows down through the channels and rises in lower chamber 1. As the power is turned on, the metal in the channels becomes heated and now metal can be added in the upper chamber 2.

The usual circulation in furnaces of this type insures that the heated metal in the channels will be continuously forced into the two chambers 1, 2 to transfer its heat to colder metal as it is added in the higher chamber 2 and to preserve the temperature of the metal in chamber 1. In the practical operation of the invention it has been found that contrary to initial expectations the temperature in the two hearths remains quite uniform. The amount of heat reaching each chamber can be regulated to prevent overheating.

By the nature of the design it can be seen that all the metal which finally is poured from the furnace must pass through the melting ducts. This flow through the ducts has a scouring action on the walls which assists in preventing impurities from forming on them. Any impurities which float remain on the surface of the metal bath in chamber 2, while those which sink down fall through the melting ducts into the recess 7 of the lower chamber 1. The metal which is poured from the furnace is, therefore, exceptionally well cleaned, being subject only to such oxidations as forms on its surface in the smaller chamber. Even this can be controlled.

The melting channels are preferably straight and are arranged at such angle that a prolongation of the same would strike the wall of the larger chamber above the proposed level of molten metal. Openings 14 are provided in the one side wall at these points through which preferably straight rigid tools may be inserted for cleaning out any impurities which may form on the duct walls. With the design as shown, this cleaning operation may be done while the furnace remains filled with the molten charge.

Cleaning of the ducts is necessary when non-metallic pieces become lodged in them, when an accumulation of impurities or slags builds up on the wall or when a piece of metal having a higher melting point than the charge is occasionally entrapped in the melt. When the obstruction is caused by the accumulation of non-metallic impurities on the duct wall, the need for cleaning shows up in the instruments by a gradual change of the power being drawn by the furnace. If the obstruction is by a piece of metal, the meter needles usually fluctuate. Impurities in either of the melting chambers may also be removed by suitable tools during operation of the furnace.

In the present furnace, the cross section of the ducts can be reduced considerably, which increases the resistance and improves the overall power factor of the furnace. The power factor in furnaces of the here disclosed type can be considerably increased in spite of a reduction of the channel cross section.

Improvement of power factor, unimportant for the smaller sized installations, becomes of major importance in the larger sized installations because of the high cost of power factor compensating equipment required when the power factor is low. In addition to the saving of power factor compensating equipment, when the power factor is high, there is a further considerable saving in eddy current losses due to the reduction of the stray magnetic field.

The straight melting channels 3, 4, 5 and the parts of the melting chambers adjacent to them form two closed current paths in which current is induced by the primary coils. These loops are of rectangular shape and to obtain the best coupling the primary coils should also be of rectangular shape.

In the furnace shown, the axis of the primary coil is in the vertical position during the melting operation and the melting channels lie at an angle of about between 40 to 50 degrees from the vertical. This angle has been found most suitable for cleaning and self-cleaning operations. The angular position of the ducts in the furnace of this type is advantageous in other ways in that the bulk of resistance of the melting loop is made up in the duct and by placing it at an oblique angle with respect to the primary coil it is longer and, therefore, has more resistance than if it is placed at right angles to the axis. If a shorter duct length is desired, the transformer primary assembly may be placed at an angle in the furnace more nearly approaching a right angle with the ducts.

In respects other than as noted in this specification, the present furnace is substantially similar in construction and operation to submerged resistor furnaces of standard design. The usual frame and support members, pouring spout, insulation and the like are not herein described as they are well known to those who work with such furnaces.

I claim:

1. A method of melting metals and cleaning the melting loop in an induction furnace provided with a plurality of hearths connected by straight inclined loop channels which are threaded by a transformer unit comprising passing cleaning tools in an inclined straight direction from the outside of the furnace through the said channels and removing the slag deposits from the channel walls by means of these cleaning tools while keeping the furnace filled with the molten metal charge.

2. A method of melting metals and cleaning the melting loop in an induction furnace provided with a plurality of hearths connected by loop forming straight inclined channels which are threaded by a transformer unit comprising passing cleaning tools in an inclined straight direction through a side wall of the furnace into the said channels and removing the slag deposits from the channel walls by means of these cleaning tools while keeping the furnace filled with the molten metal charge.

3. A method of melting metals and cleaning the melting loop in an induction furnace provided with two hearths having their bottoms at a different level and being connected by loop forming straight inclined channels which are threaded by a transformer unit, comprising passing cleaning tools in an inclined straight direction from the outside wall of the furnace through the hearth having its bottom at a higher level into the said connecting channels and removing the slag deposits from the channel walls by means of the said cleaning tools while keeping the furnace filled with the molten metal charge.

4. A method of melting metals and cleaning the melting loop in an induction furnace provided with a plurality of hearths having their bottoms at a different level and being connected by loop forming straight inclined channels which are threaded by a transformer unit comprising preheating the said channels, pouring molten metal into a hearth having its bottom at a higher level up to above the entrance points of the loop into the hearth, passing the metal from said hearth into a hearth having its bottom at a lower level, turning-on the electric power and heating the metal, adding fresh metal, passing cleaning tools from the outside of the furnace in an inclined straight direction through the hearth having its bottom at a higher level into the said connecting channels and removing the slag deposits from the channel walls while keeping the furnace filled with the molten metal.

5. A method of melting metals and cleaning the melting loop in an induction furnace provided with a plurality of hearths having their bottoms at a different level and being connected by loop forming straight inclined channels comprising passing cleaning tools in an inclined straight direction from the outside of the furnace through the hearth having its bottom at a higher level into the said connecting channels, cleaning the said connecting channels while the furnace is filled with the molten metal and pouring the metal from a hearth having its bottom at a lower level.

MANUEL TAMA.

REFERENCES CITED

The following references are of record in the file of this patent:

UNITED STATES PATENTS

| Number | Name | Date |
|---|---|---|
| 1,313,274 | De Barros | Aug. 19, 1919 |
| 2,427,817 | Tama | Sept. 23, 1947 |

FOREIGN PATENTS

| Number | Country | Date |
|---|---|---|
| 514,357 | Germany | Dec. 11, 1930 |
| 642,556 | Germany | Feb. 18, 1937 |
| 837,843 | France | Nov. 18, 1938 |
| 845,356 | France | May 8, 1939 |
| 109,793 | Sweden | Feb. 15, 1944 |

OTHER REFERENCES

Publication "Metallwirtshaft" of February 5, 1943 (article).